(12) United States Patent
Bennett et al.

(10) Patent No.: US 9,527,353 B2
(45) Date of Patent: Dec. 27, 2016

(54) SELF-CLOSING FILTER

(71) Applicant: Eaton Corporation, Cleveland, OH (US)

(72) Inventors: Larry P. Bennett, Bloomfield Hills, MI (US); Lalit M. Patil, Pune, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/570,663

(22) Filed: Dec. 15, 2014

(65) Prior Publication Data

US 2015/0096445 A1 Apr. 9, 2015

Related U.S. Application Data

(63) Continuation of application No. PCT/US2013/059124, filed on Sep. 11, 2013.

(51) Int. Cl.
*B60C 29/06* (2006.01)
*B60C 23/12* (2006.01)
(Continued)

(52) U.S. Cl.
CPC ........... *B60C 29/06* (2013.01); *B01D 46/0019* (2013.01); *B01D 46/0036* (2013.01);
(Continued)

(58) Field of Classification Search
CPC .......... B60C 23/18; B60C 23/19; B60C 23/10; B60C 23/12; B60C 13/023; B60C 29/04; B60C 29/06; B60C 29/066
(Continued)

(56) References Cited

U.S. PATENT DOCUMENTS 3,078,125 A * 2/1963 Aske, Jr. .................... 301/37.23
3,204,681 A * 9/1965 Olagnier et al. .............. 152/154
(Continued)

FOREIGN PATENT DOCUMENTS

EP 2433822 3/2012
EP 2455239 5/2012
WO WO 2005/012009 2/2005

OTHER PUBLICATIONS

International Search Report and the Written Opinion for International application PCT/US2013/059124 dated Sep. 11, 2013 (10 pages).

*Primary Examiner* — Amber R Orlando
*Assistant Examiner* — Britanny Precht
(74) *Attorney, Agent, or Firm* — Dierker & Kavanaugh, P.C.

(57) ABSTRACT

A self-closing filter includes a housing to be attached to a sidewall of a self-inflating pneumatic tire. The housing includes a cavity to be in fluid communication with an atmospheric air inlet of a pneumatic control valve for the self-inflating tire. The self-closing filter further includes a filtration media to block contaminants from entering the cavity while allowing atmospheric air to be drawn through the filtration media into the cavity by a pump of the self-inflating tire. The self-closing filter still further includes a valve attached to the housing. The valve is selectively actuatable to an open state and to a closed state. The filtration media is exposed to an atmosphere impinging upon the tire when the valve is in the open state. The closed state is to prevent exposure of the filtration media to the contaminants when the valve is in the closed state.

13 Claims, 10 Drawing Sheets

(51) Int. Cl.
    *B01D 46/00*     (2006.01)
    *B01D 46/54*     (2006.01)
    *B01D 46/42*     (2006.01)

(52) U.S. Cl.
    CPC ....... *B01D 46/4272* (2013.01); *B01D 46/543* (2013.01); *B60C 23/12* (2013.01); *B01D 2253/102* (2013.01)

(58) Field of Classification Search
    USPC ..... 96/11, 134, 108, 399, 385.3, 4; 152/523, 152/154
    See application file for complete search history.

(56) References Cited

U.S. PATENT DOCUMENTS

| | | | | |
|---|---|---|---|---|
| 3,304,981 | A * | 2/1967 | Sheppard | 152/426 |
| RE29,410 | E * | 9/1977 | Yoshino | 427/389.9 |
| 5,522,910 | A * | 6/1996 | Fogal, Sr. | 55/505 |
| 5,616,196 | A * | 4/1997 | Loewe | 152/426 |
| 5,791,371 | A * | 8/1998 | Kemp, II | 137/383 |
| 5,865,917 | A * | 2/1999 | Loewe | 152/426 |
| 5,975,174 | A * | 11/1999 | Loewe | 152/415 |
| 6,394,159 | B1 * | 5/2002 | Cobb | 152/416 |
| 8,235,081 | B2 * | 8/2012 | Delgado et al. | 152/419 |
| 8,534,335 | B2 * | 9/2013 | Benedict | 152/426 |
| 2004/0237733 | A1 * | 12/2004 | Lewis | 81/461 |
| 2007/0151648 | A1 * | 7/2007 | Loewe | 152/419 |
| 2008/0289739 | A1 * | 11/2008 | Bol | 152/425 |
| 2010/0288411 | A1 * | 11/2010 | Loewe | 152/419 |

* cited by examiner

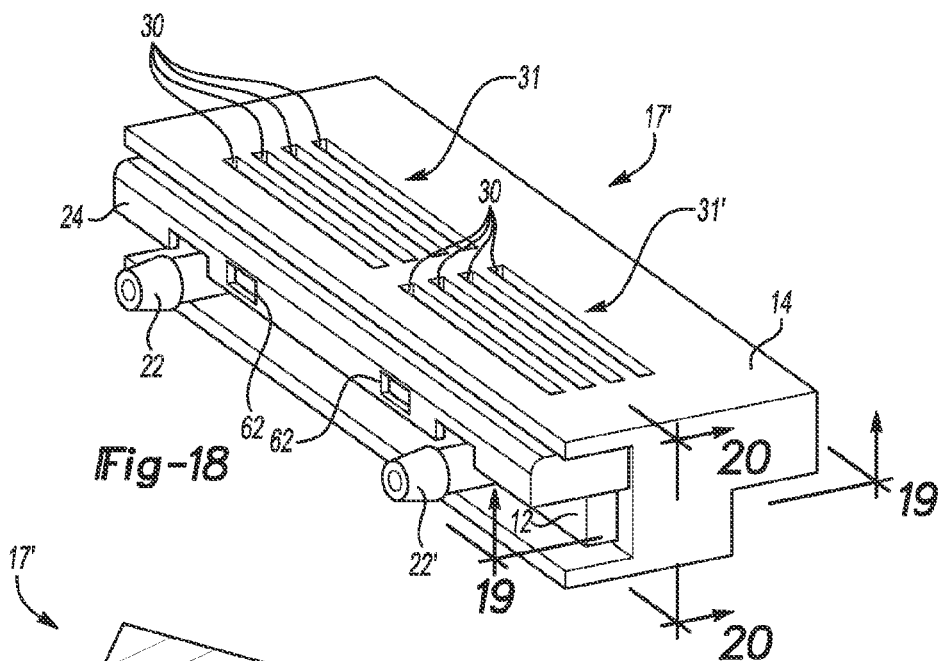
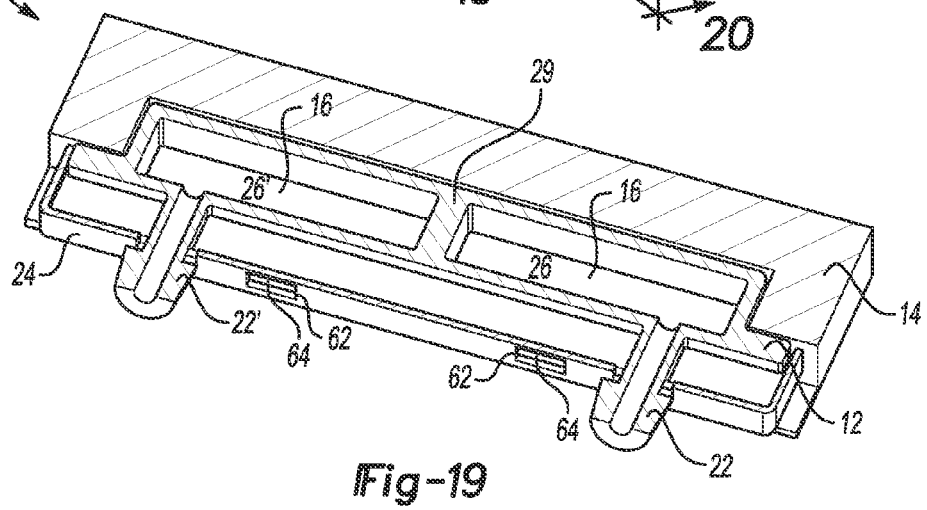
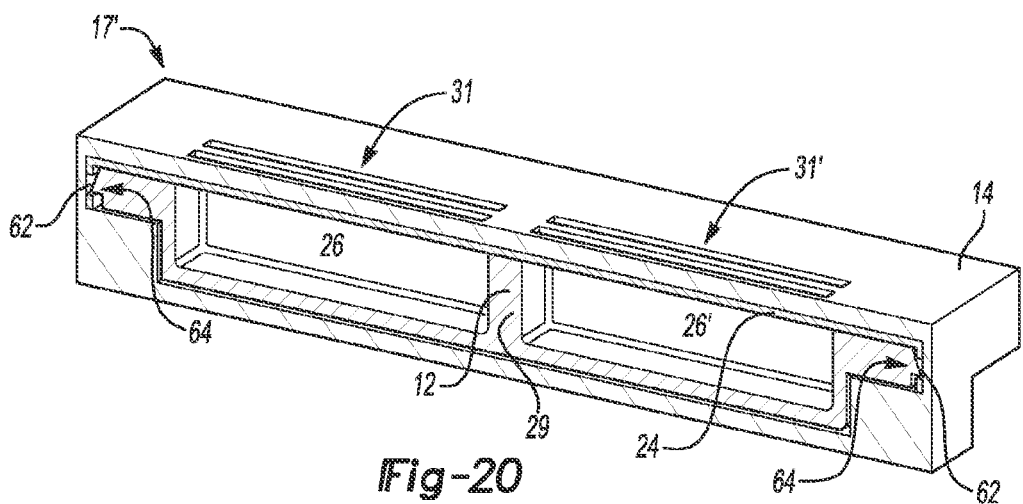

US 9,527,353 B2

SELF-CLOSING FILTER

CROSS-REFERENCE TO RELATED APPLICATIONS

This application is a continuation of International application S.N. PCT/US2013/059124, filed Sep. 11, 2013, which itself claims the benefit of U.S. Provisional Application Ser. No. 61/699,684, filed Sep. 11, 2012, and of U.S. Provisional Application Ser. No. 61/840,244, filed Jun. 27, 2013, each of which is incorporated by reference herein in its entirety.

BACKGROUND

A self-inflating tire may have a pump built into the tire. When the tire rolls, air is drawn into the pump from outside of the tire. The pump may discharge compressed air into the tire cavity to inflate the tire. A concentration of road debris exterior to the tire may be higher at certain portions of a rotation of the tire. For example, there may be more dirt, dust, mud and water near the road surface than near the top of the tire. In some self-inflating tires, road debris may be drawn into the pump with intake air.

SUMMARY

A self-closing filter includes a housing to be attached to a sidewall of a self-inflating pneumatic tire. The housing includes a cavity to be in fluid communication with an atmospheric air inlet of a pneumatic control valve for the self-inflating tire. The self-closing filter further includes a filtration media to block contaminants from entering the cavity while allowing atmospheric air to be drawn through the filtration media into the cavity by a pump of the self-inflating tire. The self-closing filter still further includes a valve attached to the housing. The valve is selectively actuatable to an open state and to a closed state. The filtration media is exposed to an atmosphere impinging upon the tire when the valve is in the open state. The closed state is to prevent exposure of the filtration media to the contaminants when the valve is in the closed state.

BRIEF DESCRIPTION OF THE DRAWINGS

Features and advantages of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

FIG. 18 is a perspective view of the example of a self-closing filter depicted in FIG. 15 with the tire wall removed;

FIG. 19 is a cross-sectional view of the example of the self-closing filter depicted in FIG. 18; and FIG. 20 is another cross-sectional view of the example of the self-closing filter depicted in FIG. 18.

DETAILED DESCRIPTION

The present disclosure relates generally to a self-closing filter. Such a filter may be used, for example, with a self-inflating pneumatic tire for a commercial truck. It is to be understood that self-closing filters according to the present disclosure may be used with various sizes of tires for various types of vehicles.

Figure 1:
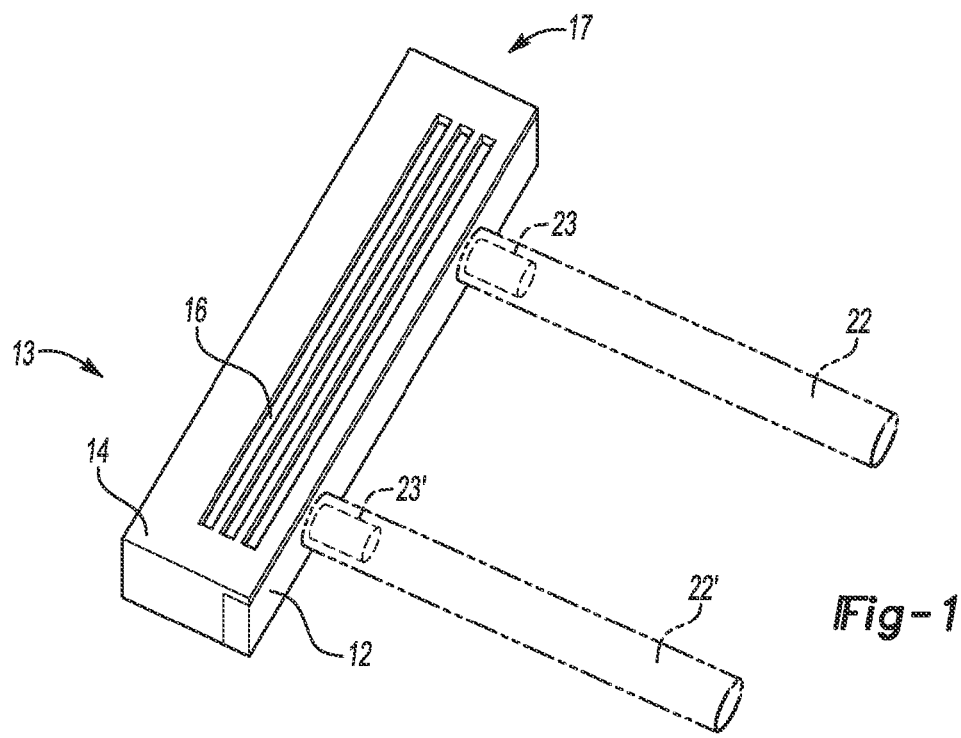
FIG. 1 is a perspective view of an example of a self-closing filter of the present disclosure.

FIG. 1 depicts an example of a self-closing filter 17 of the present disclosure. Clean (filtered) air is communicated from the self-closing filter 17 through ports 23, 23' via inlet 22 to an intake of a pneumatic control valve 19 (see FIG. 10B) for a self-inflating pneumatic tire 50 (see FIG. 2). The pneumatic control valve 19 may regulate airflow into and out of a pump (not shown) and thereby regulate air pressure in the self-inflating pneumatic tire 50. The example of the self-closing filter 17 depicted in FIG. 1 includes a housing 12, a valve 13, and a filtration media 16. The valve 13 selectively opens or closes access to the filtration media 16 by air and contaminants in the environment on the outside of the self-closing filter 17. As used herein, environment means ambient air including any contaminants present (e.g., e.g., dirt, dust, road debris, mud, water, other fluids and particulate matter, etc.). Also, outside means the space that is not enclosed by the tire 50 or the self-closing filter 17. Tires 50 operating in the environment are subjected to various contaminants in various forms. For example, a cloud of dust may envelop the lower (e.g., near the road surface-contacting) portion of a tire 50. In other examples, a tire 50 may travel through rainy conditions or through puddles of dirty water or mud, creating a splash or cloud of contaminants from operation of the tire 50 itself, or from operation of another tire nearby. The tire that causes the splash or cloud may be on the same vehicle as the self-closing filter 17, or on other vehicles.

The self-closing filter 17 may include a cover 14 disposed adjacent to the filtration media 16 for operation of valve 13 as will be discussed in further detail below. In an example, the housing 12 and cover 14 may be generally shaped like a rectangular box. The self-closing filter 17 may be any size with sufficient airflow capacity to allow the self-inflating pump to operate without significant restriction to the airflow. An example of significant restriction is in a range from about 10 inches of water to about 30 inches of water or greater pressure drop at the maximum flow rate through a clean, dry filter. In an example, the box may be about 5 cm wide by 2 cm tall (along the tire radial dimension) by 1 cm deep (along an axis parallel to the axis of rotation of the tire 50). In another example, the self-closing filter 17 has a generally round shape (i.e., including a portion of a spherical shape, a cylindrical shape, or an elongated rounded shape similar to a chicken egg, etc.). In another example, the self-closing filter 17 may be an ellipse with a major axis ranging from about 20 mm to about 50 mm, a minor axis ranging from about 5 mm to about 20 mm, and a depth ranging from about 5 mm to about 15 mm. The self-closing filter 17 may have rounded edges, for example, if the tire 50 is molded to conform to the housing 12 and cover 14. In an example, an area of filter media exposed to the outside environment ranges from about 50 square mm (millimeters) to about 100 square mm.

In examples of the present disclosure, the cover 14 may be movable to open and close the valve 13. The cover 14 may be made of a resilient material, or the cover 14 may be substantially rigid. In an example having a substantially rigid cover 14, the cover 14 may be attached to a resilient actuator, or the resilience of the tire sidewall itself may be used to move the cover 14. Movement of the cover 14 may open and close access to the filtration media 16 by the outside environment. The cover 14 may be attached to the housing 12 to close the valve 13 of self-closing filter 17 and prevent or substantially reduce the amount of contaminants that may enter the filtration media 16.

Figure 2:
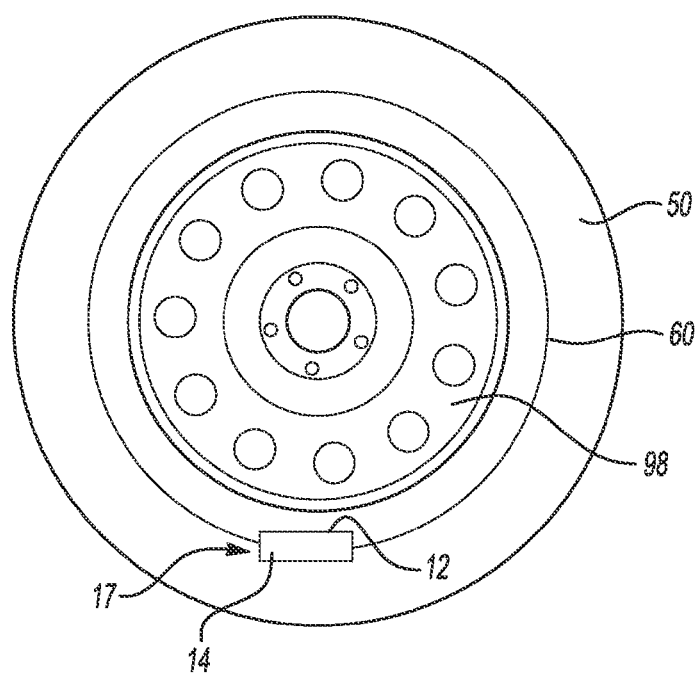
FIG. 2 is an end view of a wheel and tire with an example of a self-closing filter disposed thereon according to an example of the present disclosure.

As shown for example in FIG. 2, the housing 12 may be accommodated on, or fitted in a sidewall of a self-inflating pneumatic tire 50 for connection to a control valve 19 (see FIG. 10B) inside the tire 50. The housing 12 may be molded into the sidewall of the tire 50 during the production process of tire 50. Other attachment mechanisms will be discussed further below.

Figure 3:
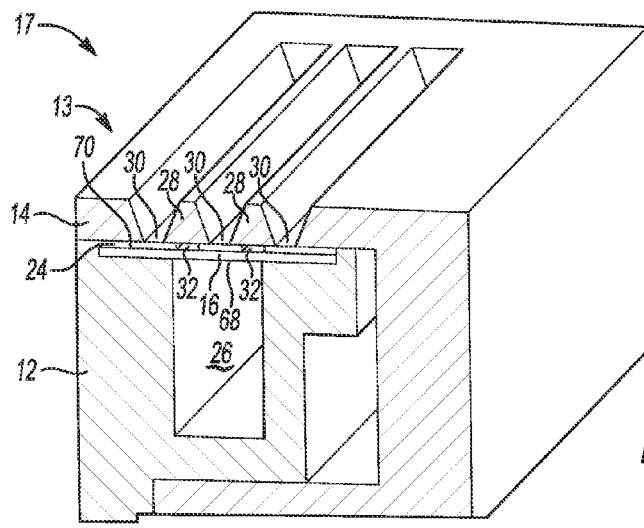
FIG. 3 is a semi-schematic, cross-sectional perspective view of an example of a self-closing filter of the present disclosure.
Figure 4:
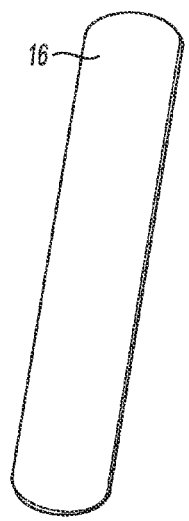
FIG. 4 is a perspective view of an example of a filtration media according to the present disclosure.
Figure 5:
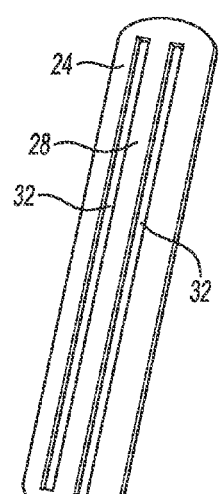
FIG. 5 is a perspective view of an example of a shutter plate with apertures according to the present disclosure.
Figure 6:
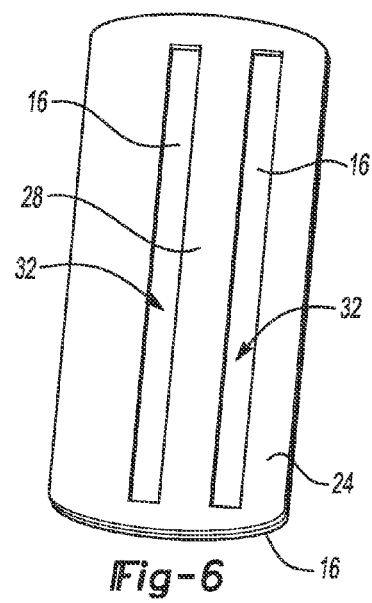
FIG. 6 is a perspective view of the example of the filtration media depicted in FIG. 4 attached to the example of the shutter plate depicted in FIG. 5 according to the present disclosure.
Figure 7:
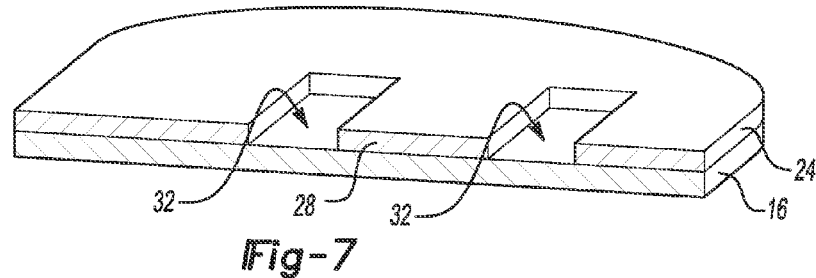
FIG. 7 is a perspective cross-sectional view of the example of FIG. 6.

Referring to FIG. 3, the cover 14 may be connected to the housing 12 in such a way that the cover 14 may slide over the filtration media 16. The cover 14 may slide directly over the filtration media 16, or there may be a shutter plate 24 disposed between the filtration media 16 and the cover 14 as depicted in FIG. 3. The cover 14 may operate as a part of valve 13, selectively actuatable to an open state and to a closed state (e.g., by flexure of the tire 50). FIG. 3 depicts the valve 13 in the closed state with the vanes 28 covering the apertures 32. The housing 12 may have a substantially leak proof connection with the filtration media 16. Substantially leak proof means a relatively small amount of air may pass through the filtration media 16 along edges thereof. In an example, air leakage around the edges of the filtration media 16 may be less than 10 percent of the maximum airflow rate through the filtration media 16.

When the valve 13 is in the open state, the filtration media 16 is exposed to an atmosphere impinging upon the tire 50. It is to be understood that the atmosphere includes ambient air and contaminants. The closed state is to prevent exposure of the filtration media 16 to the contaminants by operation of the valve 13.

It is to be understood that the filtration media 16 may exclude contaminants from the cavity 26 while allowing air to pass through when the valve 13 is in the open state. The filtration media 16 may withstand occasional splashes from the outside environment. In some cases, the filtration media 16 may be submerged in water, for example when driven on a road flooded with water. In operation, a tire 50 on a vehicle may be subjected to contaminants that may form a cloud generally in a zone defined around the contact patch of tire 50 up to around a portion of the rim of wheel 98 nearest the road surface 40. In the closed state, the valve 13 operates to substantially prevent the access of such contaminants to the filtration media 16.

It is to be further understood that the pump of the self-inflating tire may not always draw air in as tire 50 rotates. For example, the pump may not pump if the tire is at a predetermined pressure. The pump may have an intake phase corresponding to a range of rotation of the tire. In examples of the present disclosure, the intake phase of the peristaltic pump may (or may not) be coordinated with the opening and closing of the valve 13 of self-closing filter 17. In an example, there may be a vacuum behind the self-closing filter 17 induced by the pump.

It is to be understood that the mass of air pumped into the tire cavity by the pump (and therefore through the self-closing filter 17) according to the present disclosure in a single revolution may be relatively small compared to the mass of air in a fully inflated tire. Since a tire may roll hundreds of revolutions per mile, and many miles per hour, the pumping capacity of a self-inflating tire may be substantial. In an example, a self-inflating tire 50 may pump enough air to make up for normal losses in the tire. For example, a pump may add about 1 psi into a 100 psi tire over a month. A range of airflow from about 250 SCCM (Standard Cubic Centimeters per Minute) to about 20000 SCCM may flow through the self-closing filter 17. In terms of mass airflow, the same example would range from about 0.3 g (gram) to about 26 g of dry air per minute at STP. In an example, a commercial truck tire may contain 150 liters of air at about 100 psi (689 kilopascals) under normal operating conditions.

In examples of the present disclosure, the cover 14 may include shutter vanes 28 defining openings 30 in cover 14. The shape of the vanes 28 may be trapezoidal in cross-section as shown in FIG. 3. The trapezoid is wider at the surface that contacts the shutter plate 24. Opposed sides of each vane 28 taper together in a direction away from the shutter plate 24. This shape may help to encourage dispersion of contaminants away from the aperture 32 as the tire 50 rotates by providing a wedge shaped leading edge to dig under a layer of contaminates as the vane 28 moves over the shutter plate 24.

The filtration media 16 may be disposed in contact with the shutter plate 24 to filter air flowing through the filtration media 16 into a cavity 26 of the self-closing filter 17. The cavity 26 is in fluid communication with at least one port 23 (see FIG. 1) providing air to the pump via a pneumatic control valve 19 (as shown, e.g., in FIG. 10B) of the self-inflating tire 50. The shutter plate 24 may present a more durable, less abrasive surface for the cover 14 to slide over compared to the filtration media 16. The filtration media 16 may block contaminants from entering the cavity 26 while allowing atmospheric air to be drawn through the filtration media 16 into the cavity 26 by a pump of the self-inflating tire 50. In an example, the filtration media 16 may substantially block contaminants from entering the cavity 26 while allowing a small amount of contaminants to pass through the filtration media 16. As used herein, substantially block means contaminants in the form of particulate matter will be blocked if the particulate matter is larger than a predetermined size. For example, the efficiency of the filtration media 16 may be at least about 90 percent when exposed to 150 grams of dust at a maximum flow rate using SAE J726 JUN2002, Air Cleaner Test Code, Section 5.4. After exposure to the dust, the pressure drop across the filter is within about 70% of the pressure drop at clean filter conditions. Pressure drop is measured at maximum flow rate. The pressure drop across clean self-closing filter 17 may be less than about 1 psi when measured at maximum flow rate. It is to be understood that the pump is operatively connected to control valve 19.

The cover 14 and cavity 26 may be sized to accommodate the airflow requirements of the self-closing filter 17. An example of a self-closing filter 17 of the present disclosure may have multiple vanes 28, openings 30, and apertures 32. A single vane 28 may also be used to open and close the valve 13 to allow and prevent access to the filtration media 16 by air and contaminants in the environment on the outside of the self-closing filter 17.

In an example, the self-closing filter 17 assembly may omit the shutter plate 24. A vane 28 (or portion of cover 14) in direct contact with the filtration media 16 may selectively cover a cavity 26 disposed on a clean side 68 of the filtration media 16. The clean side 68 of the filtration media 16 is opposite the dirty side 70 of the filtration media 16. The dirty side 70 of the filtration media 16 is the side of the filtration media 16 exposed to the outside environment. The clean side 68 of the filtration media 16 is exposed to the cavity 26. The cavity 26 may be sized to be covered by a single vane 28 when in the closed state. As an example to illustrate relative sizes, the cover 14 may deflect about 4 mm from the open state to the closed state where an aperture 32 is about 2 mm wide (along the deflection direction). The cavity 26 may be sized to accommodate multiple openings 30 or a single opening 30. The shutter plate 24 may have one or more apertures 32 sized to cooperate with the deflection of the vanes 28. In an example, the apertures 32 may be about 2 mm wide while the vanes 28 may be about 6 mm wide at a surface adjacent the shutter plate 24, while openings 30 may be about 2 mm wide to accommodate about 4 mm deflection of cover 14.

FIGS. 4-7 together show an example of filtration media 16 and shutter plate 24. Shutter plate 24 may define apertures 32, shown, e.g., in FIGS. 5-7, to expose the filtration media 16 to the atmosphere impinging upon the tire 50 when the valve 13 is in the open state. A membrane may be used as a filtration media 16 to block water or other contaminants. As used herein, membrane means a layer of material which serves as a selective barrier between two phases (e.g., liquid water and vapor) and remains impermeable to specific particles, molecules, or substances when exposed to the action of a driving force. The membrane, in an example, may be about 0.5 mm thick and may be fixed to shutter plate 24 with an adhesive. In another example, the membrane may be attached to the shutter plate 24 by welding (e.g. heat stake).

The filtration media 16 may include a membrane layer; woven fiber layer; a non-woven fiber layer; a reticulated foam layer; an activated carbon layer; a porous solid layer; or combinations thereof. Examples of fiber layers may include a polytetrafluoroethylene (PTFE) fiber (e.g., Teflon® fiber, available from E. I. du Pont de Nemours and Company, Wilmington, Del.) and may include Gore-Tex® brand materials, available from W. L. Gore & Associates, Inc., Elkton, Md. Examples of the porous solid layer may include compressed carbon charcoal. In an example, the filtration media 16 may include a layer of activated carbon disposed between two woven fiber layers. An example of a membrane layer may include a non-woven nylon, e.g., Versapor® 450R from Pall.

Figure 8:
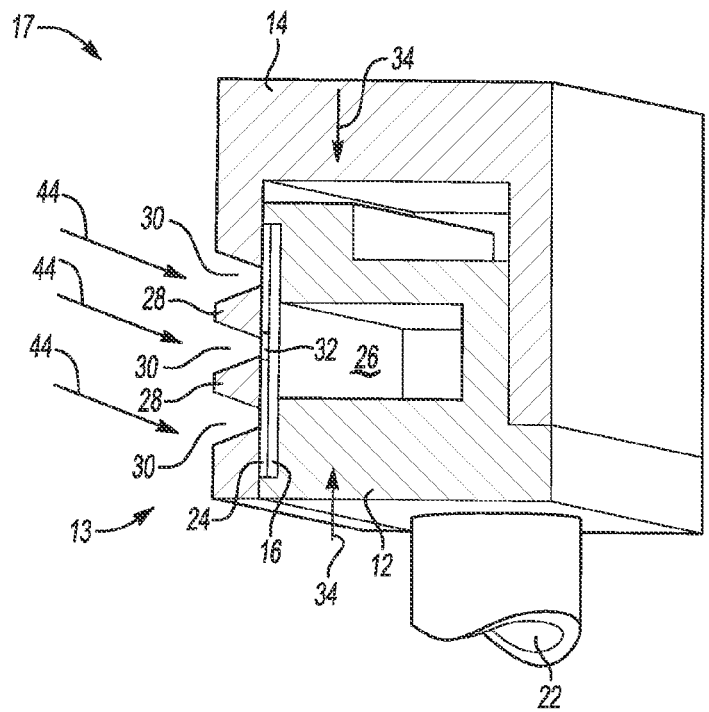
FIG. 8 is a cross-sectional perspective view of an example of a self-closing filter of the present disclosure.
Figure 9A:
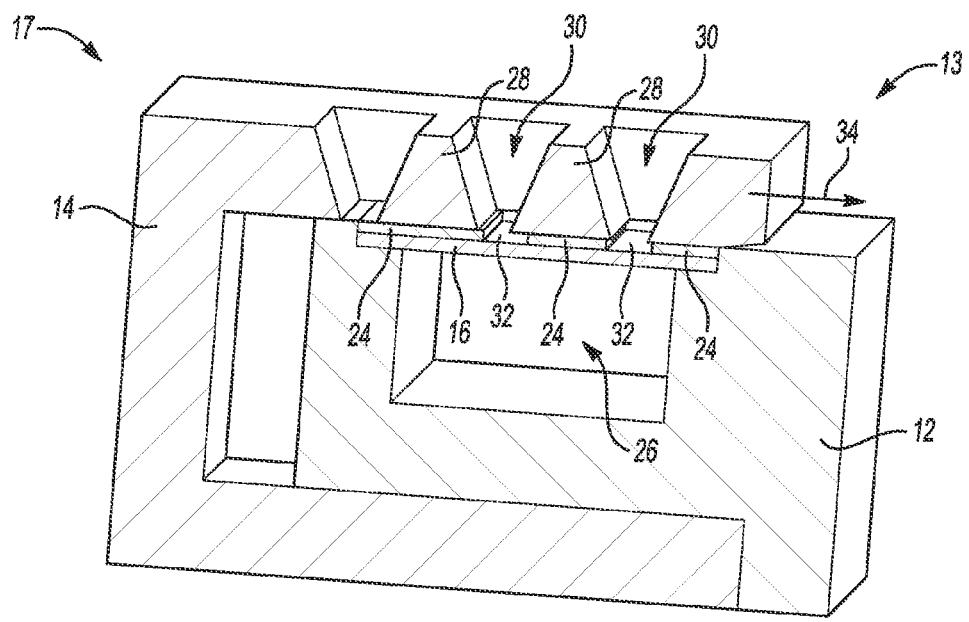
FIG. 9A depicts a cross-sectional view of an example of a self-closing filter of the present disclosure in an open state.
Figure 9B:
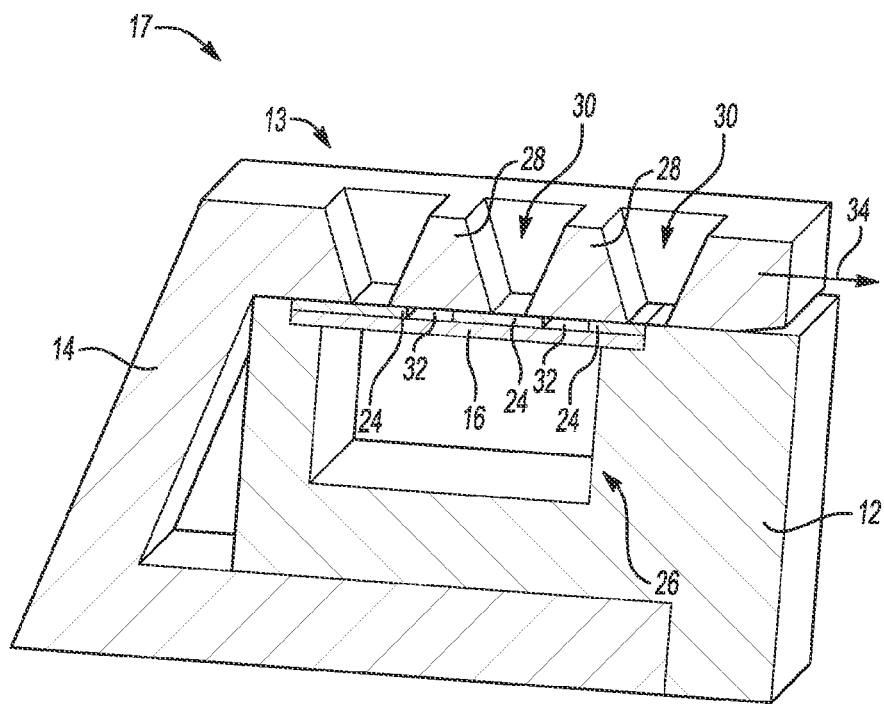
FIG. 9B depicts a cross-sectional view of an example of a self-closing filter of the present disclosure in a closed state.

FIGS. 8, 9A and 9B depict examples of a self-closing filter 17 according to the present disclosure. FIG. 8 depicts an example with a single aperture 32 and FIGS. 9A and 9B depict an example with two apertures 32. It is to be understood that reversible deflection of cover 14 is indicated by arrows 34. In FIG. 9B, deflection of cover 14 causes shutter vanes 28 to cover apertures 32 in shutter plate 24 to be closed to block air and contaminants from accessing the filtration media 16 from the outside environment. As such, the shutter vane 28 may be actuatable to cover the apertures 32 in the closed state and to not cover the apertures 32 in the open state. In FIG. 8, arrows 44 depict airflow near the valve 13. While FIG. 9A depicts an example showing self-closing filter 17 in an open state, FIG. 9B depicts an example showing the cover 14 deformed to provide a closed state of valve 13. As shown in FIG. 9B, the vanes 28 and apertures 32 are sized such that the surfaces of vanes 28 facing the shutter plate 24 cover the apertures 32. Arrow 35 indicates the direction of deformation that has already occurred, positioning cover 14 to create a closed state of valve 13.

Figure 10A:
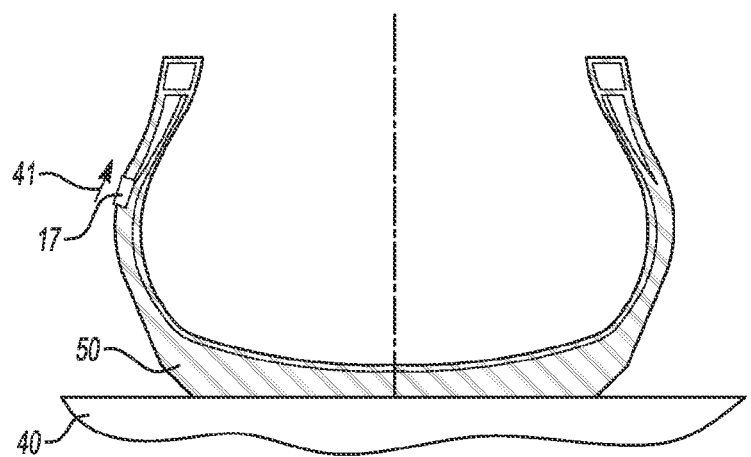
FIG. 10A is a semi-schematic cross-sectional view of an example of a self-closing filter on a tire according to the present disclosure.
Figure 10B:
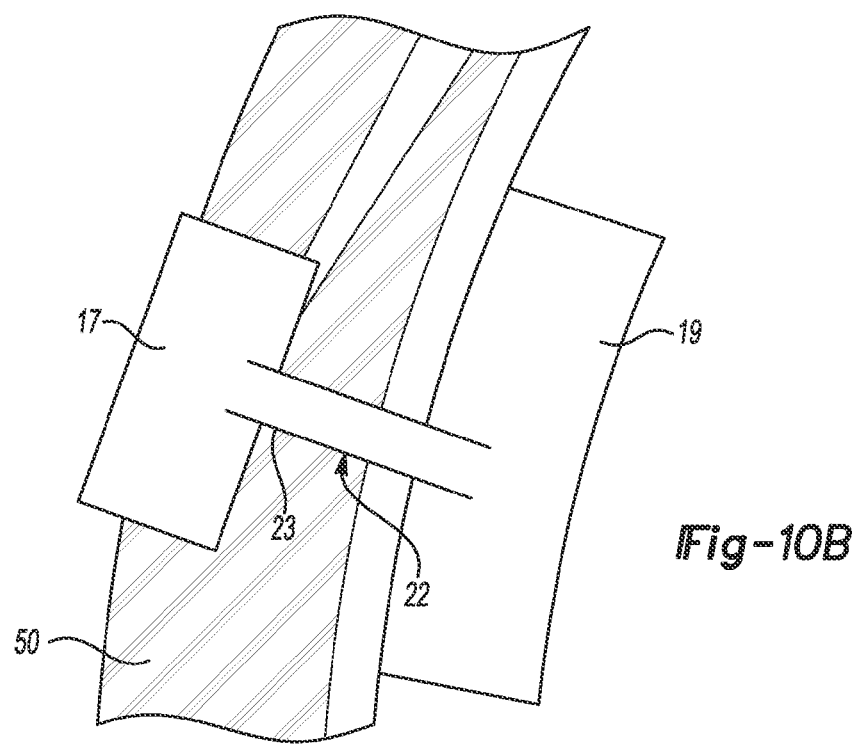
FIG. 10B is an enlarged view of a semi-schematic cross-sectional view of an example of a self-closing filter on a tire according to the present disclosure.

Referring now to FIGS. 10A and 10B, the self-closing filter 17 is depicted as fitted in the sidewall of tire 50. Loading of the tire 50 through the wheel 98 (see FIG. 2) may compress the tire 50 against the road surface 40, causing deflection of at least a portion of self-closing filter 17 (as indicated by arrow 41). Under load, the tire 50 forms a contact patch on the road surface 40 to distribute the load from the tire 50 to the road surface 40. As used herein, the contact patch means the total area of the tire tread in contact with a road surface, including the area of grooves or other depressions and may be load and inflation dependent. As used herein, road surface 40 means any surface upon which a tire 50 attached to a vehicle is operated. For example, a road surface 40 may be paved, unpaved, dirt, mud, sand, cinders, gravel, clay, stone, concrete, tarmac, macadam, paint, rubber, plastic, wood, metal, expanded metal, glass, ice, snow etc., and combinations thereof. FIG. 10B depicts the connection of self-closing filter 17 via port 23 and inlet 22 through a sidewall of the tire 50 to the control valve 19.

The self-closing filter 17 may receive a flow of air from the pneumatic control valve 19 to pass in turn from the cavity 26 through the filtration media 16 to clean the filtration media 16. As such, the self-closing filter 17 may be self-cleaned by reversing the direction of airflow through the filter. The self-cleaning may occur periodically, e.g., with every revolution of the tire as long as the air inspired in that revolution is not used during the revolution to fill the tire.

Figure 11:
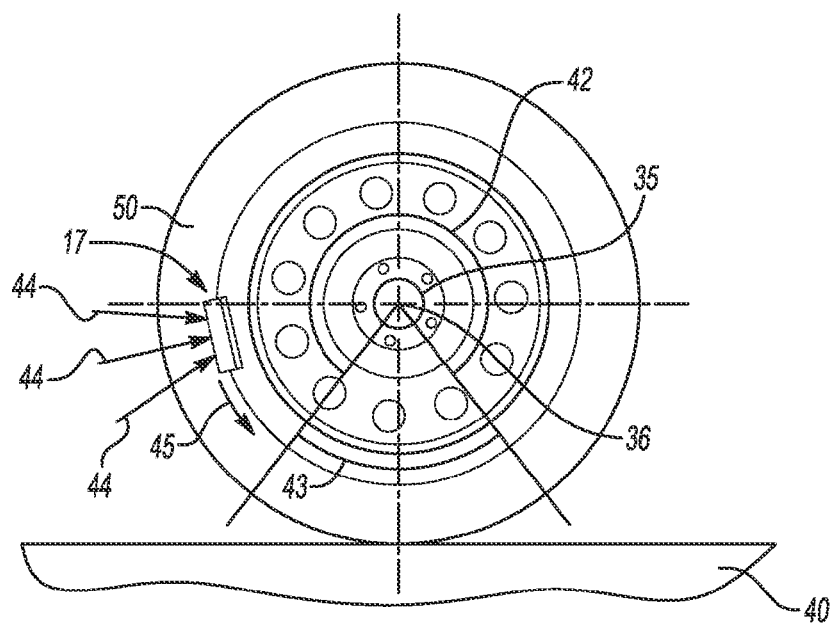
FIG. 11 is an end view of an example of a self-closing filter disposed on a tire with the tire rotated to a position in which the self-closing filter is in an open state according to the present disclosure.

FIG. 11 depicts of an example of a self-closing filter 17 disposed on a tire 50 with the tire 50 rotated to a position in which the self-closing filter is in an open state according to the present disclosure. As depicted in FIG. 11, the tire rotates about an axle 35 having an axle axis 36. In FIG. 11, the rotational positions of the tire about the axis 36 are divided into a first range 42 and a second range 43. The first range 42 and the second range 43 are mutually exclusive, i.e., the first range 42 and the second range 43 do not overlap. In an example of the present disclosure, the open state corresponds to the first range 42 of rotational positions of the tire 50 about the axle 35. The first range 42 of rotational positions of the tire 50 about the axle 35 may have the valve 13 in a location wherein a probability of contaminants impinging upon the valve 13 is minimized.

As depicted in FIG. 11, the first range 42 of rotational positions of the tire 50 about the axle 35 may have the valve 13 between about 40 degrees and about 320 degrees wherein 0 degrees is defined at a center of a contact patch between the tire 50 and the road surface 40. As used herein, between about 40 degrees and about 320 degrees means in the direction of rotation starting with 40 degrees and ending with 320 degrees. As such, between about 40 degrees and about 320 degrees does not include 0 degrees at the center of the contact patch. The curved arrow 45 indicates the direction of rotation of the tire 50. The direction of rotation indicated at 45 does not imply that the tire 50 is restricted to rotation in one direction—i.e., the tire 50 may rotate clockwise or counterclockwise. The direction of rotation is indicated in FIG. 11 to establish a direction for the polar coordinate system for this detailed description of FIG. 11.

In the example depicted in FIG. 11, the first range 42 is symmetrical about the contact patch. In other examples, the first range 42 may be asymmetrical about the contact patch. In an example the first range 42 may have the valve 13 between about 70 degrees and about 320 degrees measured in the direction of rotation 45.

Figure 12:
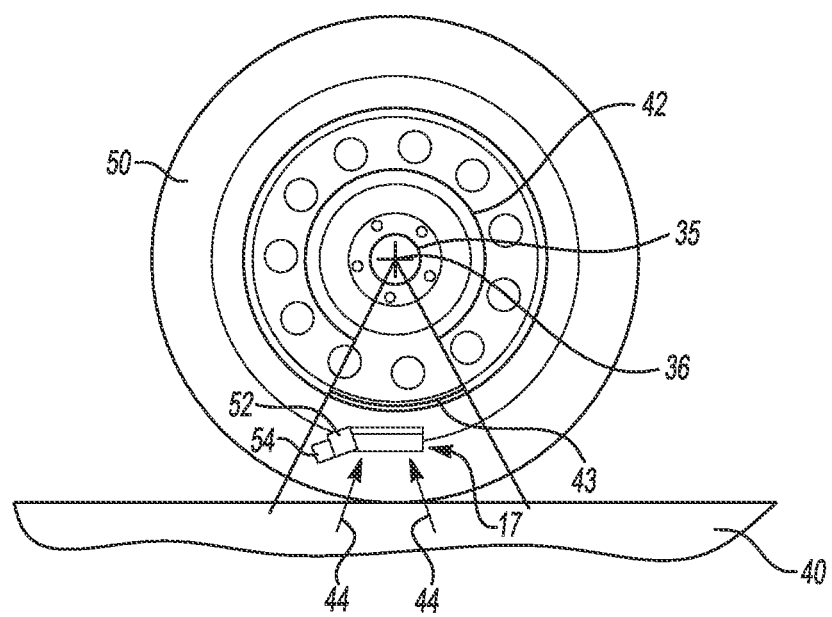
FIG. 12 is an end view of an example of a self-closing filter disposed on a tire with the tire rotated to a position in which the self-closing filter is in a closed state according to the present disclosure.

In contrast to FIG. 11, FIG. 12 depicts an example of the self-closing filter disposed on a tire 50 with the tire 50 rotated to a position in which the self-closing filter 17 is in a closed state according to the present disclosure. In the closed state, exposure of the filtration media 16 to the contaminants in the environment on the outside of the self-closing filter 17 is prevented. The closed state corresponds to the second range 43 of rotational positions of the tire 50 about the axle 35. As stated above, first range 42 and the second range 43 are mutually exclusive, i.e., the first range 42 and the second range 43 do not overlap. The second range 43 of rotational positions of the tire 50 about the axle 35 may have the valve 13 in a location wherein a probability of contaminants impinging upon the valve 13 is maximized. As depicted in FIG. 12, the second range 43 of rotational positions of the tire 50 about the axle 35 may have the valve 13 between about 320 degrees and about 40 degrees wherein 0 degrees is defined at a center of a contact patch between the tire 50 and the road surface 40. As used herein, between about 320 degrees and about 40 degrees means in the direction of rotation starting with 320 degrees and ending with 40 degrees. As such, between about 320 degrees and about 40 degrees includes 0 degrees at the center of the contact patch. Similarly to the first range 42, the second range 43 may be symmetrical or asymmetrical about the contact patch.

In examples of the present disclosure, the self-closing filter 17 assembly may be modular, thereby allowing simple replacement of the filtration media 16. In an example, the filtration media 16 is replaceable without permanently disabling a portion of the self-closing filter 17 other than the filtration media 16 to be replaced. For example, the housing 12 may be permanently fixed in the tire 50, e.g., by a molding and curing process, whereas the cover 14 may be removable to provide access to the filtration media 16 for replacement.

Further, the self-closing filter 17 may be installed on and removed from the tire wall using a special tool to make the self-closing filter 17 tamper resistant. In an example, and depicted schematically in FIG. 12, the self-closing filter assembly may have a latching feature 52 to attach the self-closing filter 17 to the tire 50. The latching feature 52 may be unlatched using a complementary-shaped key tool 54 to make the self-closing filter 17 tamper resistant. In an example, the key tool 54 and latching feature 52 may be similar in theory to a locking lugnut for a vehicle wheel including a special socket lugnut key for use as an anti-theft feature.

Various configurations of valve 13 that are actuated by linear movements to open and close access to the filtration media 16 are contemplated herein. For example, a mass may be moved against a biasing spring by centrifugal forces in combination with the compression forces of the tire sidewall. Additionally, kinematic mechanisms (e.g., levers, hinges, etc.) may be used to actuate the cover 14 in conjunction with compression of the tire 50. For example, a lever may amplify a displacement caused by compression of the tire.

Further, the vanes 28 may be integrated into the sidewall of tire 50 to allow or prevent flow to the filtration media 16. In other words, the sidewall of the tire 50 may function as the cover 14 to open and close the valve 13 without a separate cover 14.

Figure 13A:
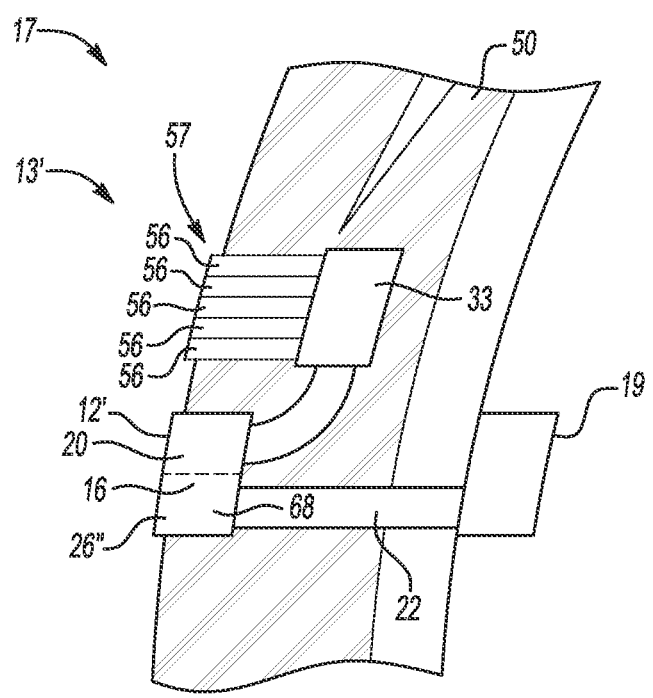
FIG. 13A is an enlarged view of a semi-schematic cross-sectional view of an example of a self-closing filter on a tire according to the present disclosure.

FIG. 13A shows an example of a self-closing filter 17 having tubes 56 that are collapsible to be the valve 13'. In such an example, valve 13' may be actuated by collapsing a wall of a tube 56 to prevent air from flowing through the tube 56. It is to be understood that one or more tubes 56 may be used for the valve 13'. For example, an array 57 of flexible hollow tubes 56 having one end open to atmosphere and the other end operatively connected to the filtration media 16 may be used. It is to be understood that the array 57 may be a single row or column and may be more than one row or column. In FIG. 13A, the tubes 56 are connected to a manifold 33. The manifold 33 is connected to housing 12' with the filtration media 16 disposed therein. The clean side 68 of the filtration media 16 is exposed to the cavity 26". The cavity 26" is connected via inlet 22 to the pneumatic control valve 19 of the self-inflating tire 50.

Figure 13B:
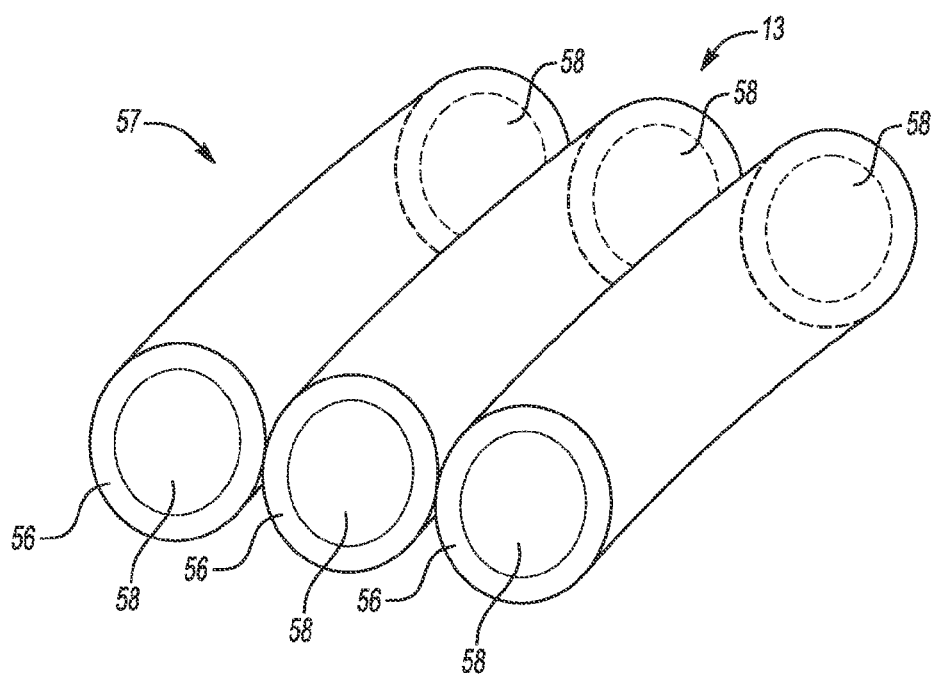
FIG. 13B is a semi-schematic perspective view of an example of an array of tubes for a self-closing filter in an open state according to the present disclosure.
Figure 13C:
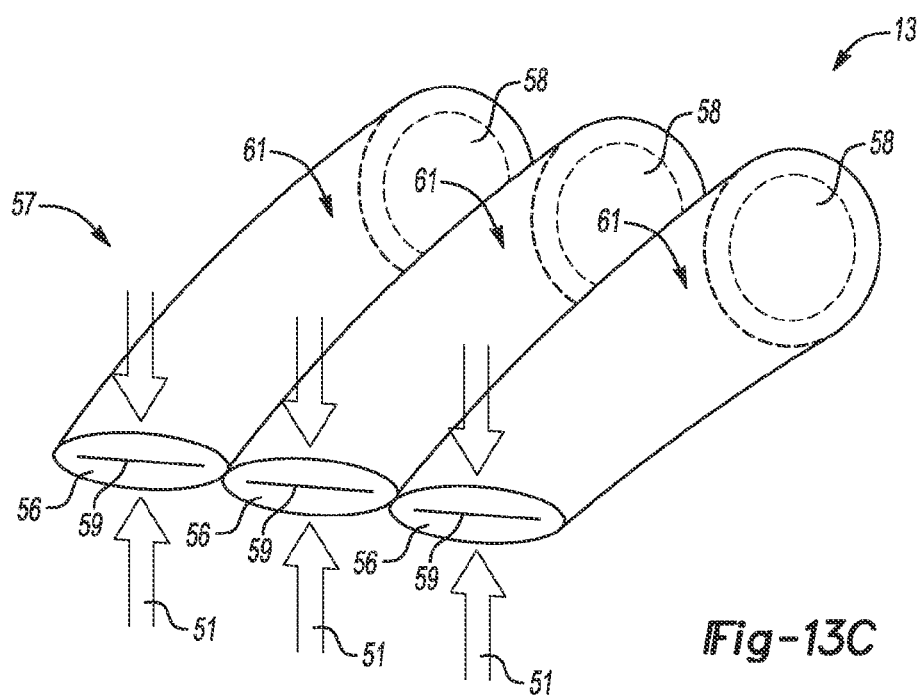
FIG. 13C is a semi-schematic perspective view of an example of an array of tubes for a self-closing filter in a closed state according to the present disclosure.
Figure 14A:
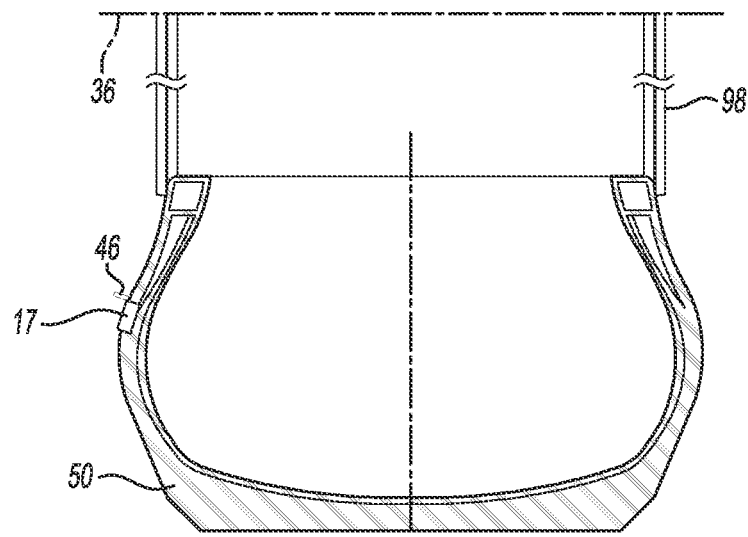
FIG. 14A is a semi-schematic cross-sectional view of an example of the self-closing filter on a tire with a sill according to the present disclosure.

FIGS. 13B and 13C together show an example arrangement of tubes 56 in an open and closed state, respectively. Tube lumens 58 may be pinched closed as indicated at reference numerals 59. Ends of the tubes 56 that are normally open to the atmosphere may be compressed (indicated by compression arrows 51) to close the tubes 56 at closed portions 59 as shown in FIG. 13C. The tubes 56 may be resiliently opened when the compression by the tire 50 is removed from the tubes 56. It is to be understood that the tube 56 may be pinched anywhere along the length of the tube 56 to close off flow into the valve 13' of self-closing filter 17. The tube 56 may be routed in various configurations in the tire 50 to take advantage of the compression occurring in the tire 50. For example, the best sidewall compression for closing the tube 56 may be remote from the best location for an entry point for air into the tube. FIG. 14A is a semi-schematic cross-sectional view of an example of the self-closing filter 17 on a tire 50 with a sill 46 according to the present disclosure. In examples of the self-closing filter 17, the filter may be shaped to allow inertial forces due to tire rotation to eject contaminants from the self-closing filter 17 and to direct contaminants around the self-closing filter 17. For example, water may tend to flow radially outward from the center (axle axis 36) of the wheel 98 to the tire 50 when the wheel 98 is rotating. In an example, a sill 46 may be included on a portion of the self-closing filer 17 closest to the axle axis 36. The sill 46 may be a protuberance to resist the flow of water and other contaminants like a dam. The water and contaminants will tend to take a path of least resistance to flow, thereby flowing around the sill 46 as well as the filtration media 16 disposed adjacent and radially outside of the sill 46. The sill 46 may direct water moving relative to the exterior of the tire 50 to flow away from the filtration media 16. One example of a sill 46 is indicated schematically in FIG. 14A.

Figure 14B:
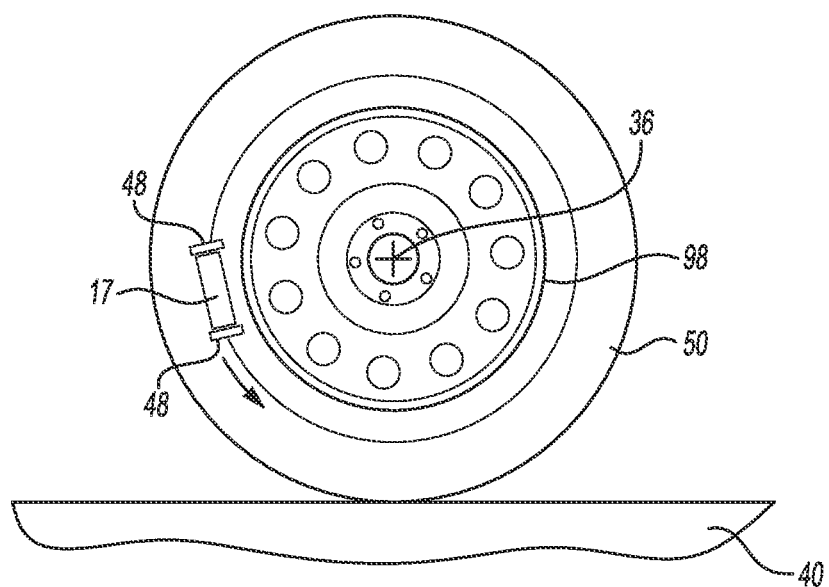
FIG. 14B is a perspective view of an example of a self-closing filter disposed on a tire with fins or spoilers according to the present disclosure.

FIG. 14B is a perspective view of an example of a self-closing filter 17 disposed on a tire 50 with fins or spoilers 48 according to the present disclosure. Air moving relative the exterior of the tire 50 may be directed using fins, spoilers, 48 or a combination thereof as depicted in FIG. 14B to cause air flow to clean debris from the exterior of the self-closing filter 17. A fin may be a protuberance that directs airflow. A spoiler may be a type of fin that spoils substantially laminar flow and causes the airflow to be turbulent. It is to be understood that airflow across the self-closing filter 17 may cause a pressure drop, and that a spoiler may reduce the pressure drop at high vehicle speeds at an opening 30 of the self-closing filter 17.

Figure 15:
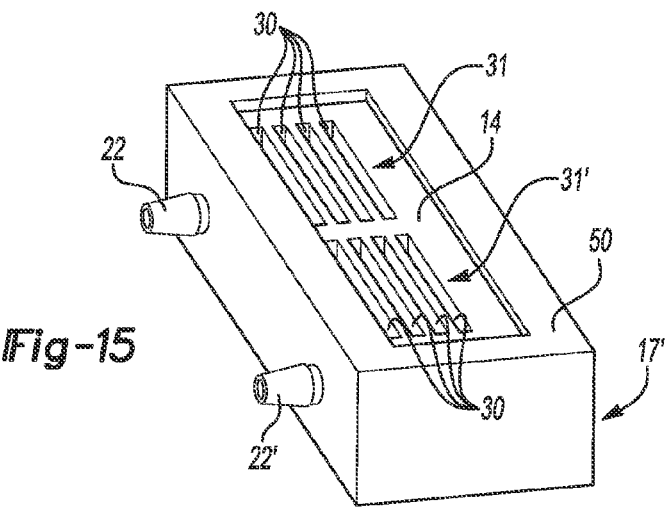
FIG. 15 is a perspective view of another example of a self-closing filter of the present disclosure.
Figure 16:
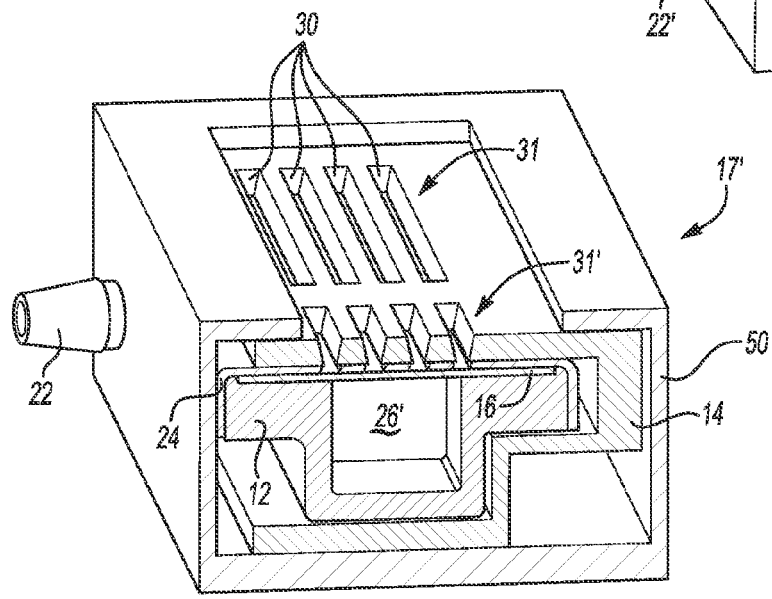
FIG. 16 is a cross-sectional view of the example of the self-closing filter depicted in FIG. 15.

FIGS. 15-20 together show an example of self-closing filter 17' having two cavities 26, 26'. Two groups 31, 31' of openings 30 are defined in cover 14. In the example depicted in FIGS. 15-20, the groups 31, 31' of openings 30 are selectively in fluid communication with respective ports, 23 and 23' through the cavities 26, 26'. Further, the self-closing filter 17' is shown within a portion of tire 50 in FIGS. 15 and 16. FIG. 16 depicts a cutaway perspective cross-sectional view of the self-closing filter 17' of FIG. 15. Cover 14 is in sliding contact with shutter plate 24'. A filtration media 16 is disposed between the shutter plate 24' and a housing 12'. In the example depicted in FIGS. 15-20, the shutter plate is formed of sheet metal and wraps around the housing 12' to trap the filtration media 16 between the shutter plate 24' and the housing 12'.

Figure 17:
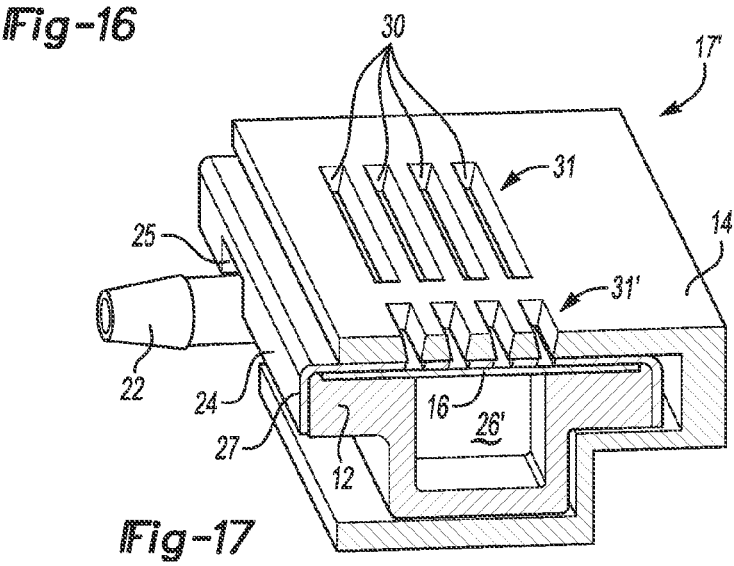
FIG. 17 is a cross-sectional view of the example of the self-closing filter depicted in FIG. 16 with the tire wall removed.

FIG. 17 depicts the portion of the self-closing filter 17' of FIG. 16 with the tire portion removed. A notch 25 is defined in flange 27 of the shutter plate 24' to provide clearance between port 23 and flange 27.

FIG. 18 is a perspective view of the self-closing filter 17' of FIG. 15 without tire 50 and shows lines of perspective for the views in FIGS. 19 and 20.

In FIG. 19, housing 12' is shown with ports 23, 23' as an integrated unit. Slots 62 engage retention feature 64 of housing 12'. The retention feature 64 may be a resilient tab, interoperable with slot 62 to deform around a relatively stiffer shutter plate 24' and enter the space created by slot 62 to form a snap lock between the shutter plate 24' and the housing 12'. Alternatively, the retention feature 64 of housing 12' may be stiffer than the shutter plate 24', and therefore shutter plate 24' may deform around retention feature 64 during assembly. The cavities 26, 26' in the example depicted in FIG. 19 are separated by a septum 29. The septum 29 may also provide support to the filtration media 16 to prevent the filtration media 16 from collapsing into the cavities 26, 26' when air is drawn through the filtration media 16. In another example (not shown), the filtration media 16 may fill the cavities 26, 26'.

FIG. 20 depicts two other instances of retention feature 64 engaging slots 62 in substantially the same way as the retention feature 64 engages the slot 62 in FIG. 19. The snap retention of the shutter plate 24' onto the housing 12' allows retention without separate fasteners, eases assembly, and facilitates serviceability of the self-closing filter 17'. The self-closing filter 17' allows the filtration media 16 to be replaced without destroying the self-closing filter 17'.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

In describing and claiming the examples disclosed herein, the singular forms "a", "an", and "the" include plural referents unless the context clearly dictates otherwise.

It is to be understood that the ranges provided herein include the stated range and any value or sub-range within the stated range. For example, a range from about 40 degrees to about 320 degrees should be interpreted to include not only the explicitly recited limits of about 40 degrees and about 320 degrees, but also to include individual values, such as 50 degrees, 75 degrees, 315 degrees, etc., and sub-ranges, such as from about 60 degrees to about 300 degrees, etc. Furthermore, when "about" is utilized to describe a value, this is meant to encompass minor variations (up to +/−10%) from the stated value.

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it will be apparent to those skilled in the art that the disclosed examples may be modified. Therefore, the foregoing description is to be considered non-limiting.

What is claimed is:

1. A self-closing filter, comprising:
   a housing to be molded into a sidewall of a self-inflating pneumatic tire, the housing having a cavity to be in fluid communication with an atmospheric air inlet of a pneumatic control valve for the self-inflating tire;
   a filtration media to block contaminants from entering the cavity while allowing atmospheric air to be drawn through the filtration media into the cavity by a pump of the self-inflating tire; and a valve attached to the housing, the valve selectively actuatable to an open state and to a closed state by resilient flexure of the sidewall of the tire, wherein the valve includes:
- a shutter plate disposed in contact with the filtration media, the shutter plate defining an aperture to expose the filtration media to an atmosphere impinging upon the tire when the valve is in the open state; and
- a cover connected to the housing, the cover reversibly deflectable to slide over the shutter plate, the cover including a shutter vane movable with the cover to cover the aperture in the closed state to prevent exposure of the filtration media to the contaminants when the valve is in the closed state, and the shutter vane movable with the cover to not cover the aperture in the open state.

2. The self-closing filter as defined in claim 1, wherein:
the open state corresponds to a first range of rotational positions of the tire about an axle;
the closed state corresponds to a second range of rotational positions of the tire about the axle; and
the second range and the first range are mutually exclusive.

3. The self-closing filter as defined in claim 2 wherein the second range of rotational positions of the tire about the axle has the valve in a location wherein a probability of contaminants impinging upon the valve is maximized.

4. The self-closing filter as defined in claim 2 wherein the first range of rotational positions of the tire about the axle has the valve in a location wherein a probability of contaminants impinging upon the valve is minimized.

5. The self-closing filter as defined in claim 2 wherein the first range of rotational positions of the tire about the axle has the valve between about 40 degrees and about 320 degrees wherein 0 degrees is at a center of a contact patch between the tire and a road surface.

6. The self-closing filter as defined in claim 1 wherein the shutter vane is actuatable to cover the filtration media in the closed state and to not cover the filtration media in the open state.

7. The self-closing filter as defined in claim 1 wherein the filtration media comprises:
a membrane layer;
a woven fiber layer;
a non-woven fiber layer;
a reticulated foam layer;
an activated carbon layer;
a porous solid layer; or
combinations thereof.

8. The self-closing filter as defined in claim 1 wherein a fin or a spoiler disposed on the self-closing filter directs air moving relative to an exterior of the tire to eject debris from an exterior of the self-closing filter.

9. The self-closing filter as defined in claim 1 wherein a sill disposed on the self-closing filter directs water moving relative to the exterior of the tire to flow away from the filtration media.

10. The self-closing filter as defined in claim 1 wherein the self-closing filter is to receive a flow of air from the pneumatic control valve to pass from the cavity through the filtration media to clean the filtration media.

11. The self-closing filter as defined in claim 1 wherein the filtration media is replaceable without permanently disabling a portion of the self-closing filter other than the filtration media to be replaced.

12. The self-closing filter as defined in claim 1 having a latching feature to attach the self-closing filter to the tire wherein the latching feature may be unlatched using a complementarily-shaped key tool to make the self-closing filter tamper resistant.

13. The self-closing filter as defined in claim 1 wherein:
the vane is trapezoidal in cross-section;
the trapezoid is wider at a surface that contacts the shutter plate; and
opposed sides of the vane taper together in a direction away from the shutter plate to disperse contaminants away from the aperture as the tire rotates by positioning a wedge shaped leading edge to dig under a layer of contaminates as the vane moves over the shutter plate.

* * * * *